US009832540B2

(12) United States Patent
Liao et al.

(10) Patent No.: US 9,832,540 B2
(45) Date of Patent: Nov. 28, 2017

(54) METHOD AND APPARATUS FOR HYBRID TRANSCODING OF A MEDIA PROGRAM

(75) Inventors: Yupeng Liao, Beijing (CN); Kang Kang, Beijing (CN); Zhibing Wang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 907 days.

(21) Appl. No.: 12/969,016

(22) Filed: Dec. 15, 2010

(65) Prior Publication Data
US 2012/0155553 A1 Jun. 21, 2012

(51) Int. Cl.
*H04B 1/66* (2006.01)
*H04N 7/12* (2006.01)
(Continued)

(52) U.S. Cl.
CPC ......... *H04N 21/8456* (2013.01); *H04N 19/14* (2014.11); *H04N 19/146* (2014.11);
(Continued)

(58) Field of Classification Search
CPC .... H04N 19/40; H04N 19/61; H04N 7/17318; H04N 21/2343; H04N 21/2662;
(Continued)

(56) References Cited

U.S. PATENT DOCUMENTS 6,577,764 B2 * 6/2003 Myler et al. ................. 382/228
6,580,755 B1    6/2003 Morimoto et al.
(Continued)

FOREIGN PATENT DOCUMENTS

GB   2306073 A   4/1997
GB   2443959     5/2008
(Continued)

OTHER PUBLICATIONS

International Search Report and Written Opinion from International Application No. PCT/US2011/065221 filed Dec. 15, 2011.
(Continued)

*Primary Examiner* — Frederick Bailey
*Assistant Examiner* — Farhan Mahmud
(74) *Attorney, Agent, or Firm* — Fountainhead Law Group P.C.

(57) ABSTRACT

A method and apparatus for encoding a source media program is disclosed. In one embodiment, the method comprises the steps of transcoding the source media program to produce a constant video quality transcoded version of the media program, determining if a portion of constant video quality version of the transcoded media program fails to satisfy a constraint, if the portion of the transcoded media program fails to satisfy the constraint, adjusting at least one transcoding parameter of a set of transcoding parameters, transcoding the portion of the source media program according to the adjusted at least one transcoding parameter to produce a constant bit rate version of the portion of the transcoded media program, and substituting the constant bit rate version of the portion of the transcoded media program for the constant video quality portion of the transcoded media program.

24 Claims, 9 Drawing Sheets

(51) Int. Cl.

| | | |
|---|---|---|
| *H04N 11/02* | (2006.01) | |
| *H04N 11/04* | (2006.01) | |
| *H04N 21/845* | (2011.01) | |
| *H04N 21/61* | (2011.01) | |
| *H04N 19/61* | (2014.01) | |
| *H04N 19/14* | (2014.01) | |
| *H04N 19/146* | (2014.01) | |
| *H04N 19/154* | (2014.01) | |
| *H04N 19/194* | (2014.01) | |
| *H04N 19/40* | (2014.01) | |
| *H04N 19/15* | (2014.01) | |

(52) U.S. Cl.
CPC ........... *H04N 19/15* (2014.11); *H04N 19/154* (2014.11); *H04N 19/194* (2014.11); *H04N 19/40* (2014.11); *H04N 19/61* (2014.11); *H04N 21/6125* (2013.01)

(58) Field of Classification Search
CPC ............... H04N 19/176; H04N 19/172; H04N 21/234309; H04N 21/6125; H04N 21/47202; H04N 19/124; H04L 29/06027; H04L 67/2823
USPC .......................................... 375/240.26, 240.27
See application file for complete search history.

(56) References Cited

U.S. PATENT DOCUMENTS

| | | | |
|---|---|---|---|
| 6,925,120 | B2 | 8/2005 | Zhang et al. |
| 2005/0276284 | A1* | 12/2005 | Krause et al. ................. 370/538 |
| 2006/0071825 | A1* | 4/2006 | Demos ............................. 341/50 |
| 2006/0088222 | A1* | 4/2006 | Han et al. ..................... 382/232 |
| 2006/0188025 | A1* | 8/2006 | Hannuksela ............. 375/240.27 |
| 2006/0203904 | A1 | 9/2006 | Lee |
| 2006/0224762 | A1* | 10/2006 | Tian et al. .................... 709/231 |
| 2006/0259589 | A1 | 11/2006 | Lerman et al. |
| 2007/0074266 | A1* | 3/2007 | Raveendran et al. ......... 725/135 |
| 2007/0081586 | A1* | 4/2007 | Raveendran et al. ..... 375/240.1 |
| 2007/0116130 | A1* | 5/2007 | Koizumi et al. ......... 375/240.26 |
| 2007/0248163 | A1* | 10/2007 | Zuo et al. ................... 375/240.2 |
| 2008/0165849 | A1* | 7/2008 | Moriya et al. ........... 375/240.15 |
| 2009/0052540 | A1 | 2/2009 | Gutman et al. |
| 2009/0074313 | A1 | 3/2009 | Ogawa |
| 2009/0310668 | A1 | 12/2009 | Sackstein et al. |
| 2010/0080292 | A1 | 4/2010 | Coulombe |
| 2010/0166060 | A1 | 7/2010 | Ezure et al. |

FOREIGN PATENT DOCUMENTS

| | | |
|---|---|---|
| JP | 2001-157210 | 6/2001 |
| JP | 2009-500951 A | 1/2009 |
| JP | 2010-512697 | 4/2010 |
| WO | 9907158 A2 | 2/1999 |
| WO | 2006095501 | 9/2006 |
| WO | 2007/005750 A2 | 1/2007 |

OTHER PUBLICATIONS

Zhang et al.: "Two-Pass Rate Control for Constant Quality H.264/AVC High Definition Video Coding (Abstract)", 26. Picture Coding Symposium; Jul. 11, 2007-Sep. 11, 2007; Lisbon, Nov. 7, 2007, XP030080486.

Extended European Search Report dated May 23, 2016 for EP11848577.0, 10 pages.

"Commentary 2, Transcoding Connects Digital Equipment," Nikkei Electronics, Mar. 24, 2008 Issue (No. 974) Nikkei Business Publications, Inc., Mar. 24, 2008, pp. 81-88, ISSN: 0835-1680 (Document showing well-known art).

"ITU-T H.263 Appendix III (Jun. 2001)" [online] Jun. 2001, ITU-T, p. 2 (Section III.2.1), <URL:https://www.itu.int/rec/dologin_pub.asp?lang=e&id=T-REC-H.263-200106-I!App3!PDF-e&type=items> (Document showing well-known art).

Tomoaki Tanaka et al., "A study on video storage and transmission equipment for video handling techniques", IEICE Technical Report, vol. 91, No. 220, The Institute of Electronics, Information and Communication Engineers, Sep. 20, 1991, p. 63-69.

Japanese office action mailed Jun. 14, 2016 for Appln. No. 2013-544787.

Decision of Rejection dated Oct. 18, 2016 for JP Appln. 2013-544787; 5 pages.

\* cited by examiner

METHOD AND APPARATUS FOR HYBRID TRANSCODING OF A MEDIA PROGRAM

BACKGROUND OF THE INVENTION

1. Field of the Invention

The present invention relates to systems and methods for transcoding media programs, and in particular to a system and method for hybrid transcoding of media programs.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs. Particularly, digital technology has permitted the dissemination and playback of large number of media programs via the Internet using high bandwidth communications links implemented by DSL, fiber optics, cable, or satellite transmission. The dissemination of such media programs via the Internet may comprise simple downloading, progressive downloading, or streaming.

Media programs are typically transcoded before transmission to the subscriber to view or record. Transcoding is a process by which a media program is transformed from one digital form to another, typically, from a raw digital format, such as pulse code modulated (PCM) for audio and color-space (YUV) for video into a compressed digital format such as MPEG (motion pictures expert group) or H.264/MPEG-4 AVC format. Transcoding can greatly compress the associated media program to one of reduced size. In fact, the transmission of media programs over the Internet would be largely infeasible without such compression. However, such transcoders often do not allow transcoding of the media program in such a way so as to maximize the use of available bandwidth, particularly where the bit rate of the transcoded media program is temporally variable and the communications channel. The present invention satisfies that need.

SUMMARY OF THE INVENTION

To address the requirements described above, the present invention discloses a method and apparatus for encoding a source media program. In one embodiment, the method comprises the steps of transcoding the source media program to produce a constant video quality transcoded version of the media program, determining if a portion of constant video quality version of the transcoded media program fails to satisfy a constraint, if the portion of the transcoded media program fails to satisfy the constraint, adjusting at least one transcoding parameter of a set of transcoding parameters, transcoding the portion of the source media program according to the adjusted at least one transcoding parameter to produce a constant bit rate version of the portion of the transcoded media program, and substituting the constant bit rate version of the portion of the transcoded media program for the constant video quality portion of the transcoded media program. In another embodiment, an apparatus comprises a first transcoder for transcoding the source media program to produce a constant video quality transcoded version of the media program, a constraint decision module determining if a portion of constant video quality version of the transcoded media program fails to satisfy a constraint, an adjustment module for adjusting at least one transcoding parameter of a set of transcoding parameters if the portion of the transcoded media program fails to satisfy the constraint, a second transcoder for transcoding the portion of the source media program according to the adjusted at least one transcoding parameter to produce a constant bit rate version of the portion of the transcoded media program, and a splicer for substituting the constant bit rate version of the portion of the transcoded media program for the constant video quality portion of the transcoded media program.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
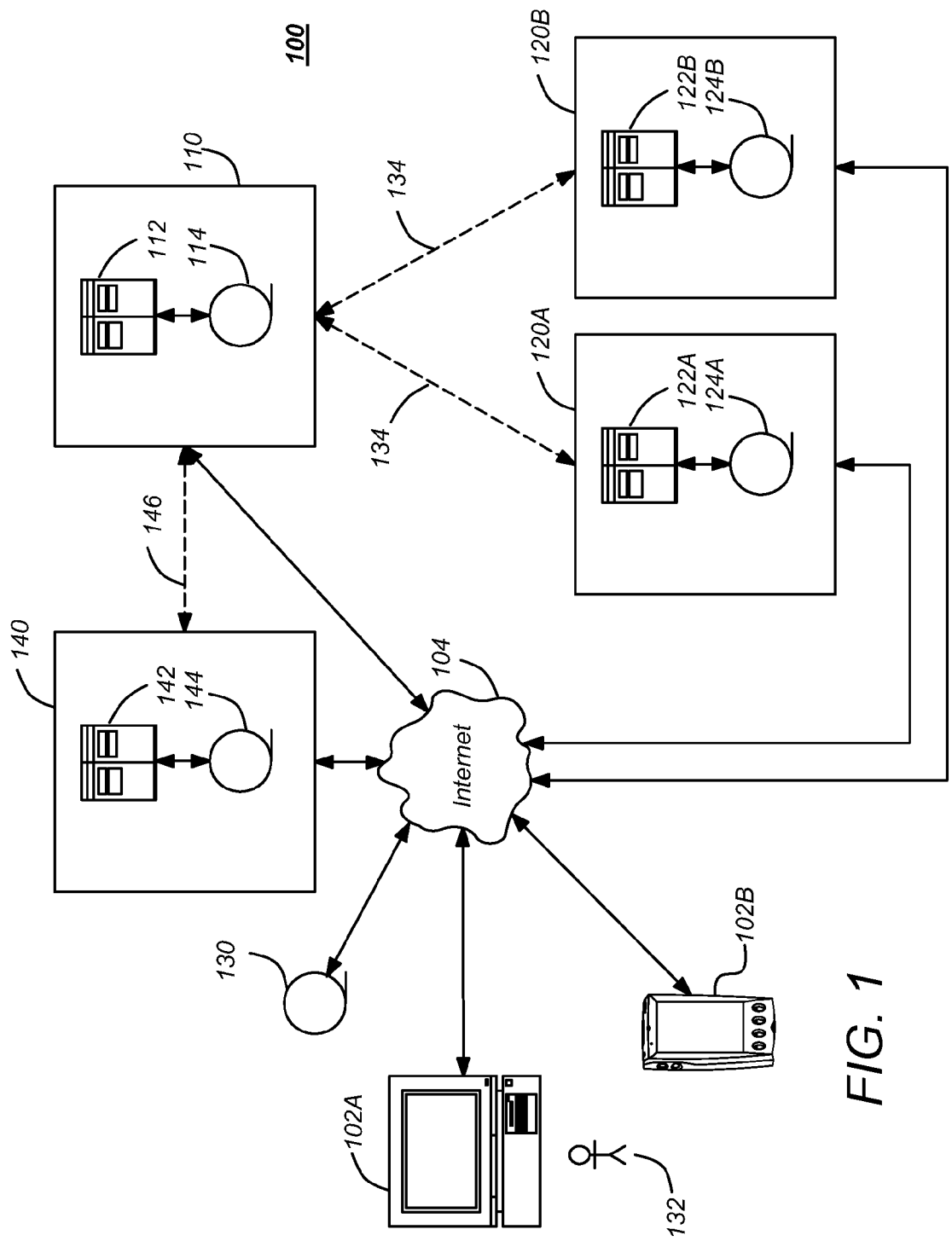
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider, however, the media program provider 110 may instead transmit media programs by simple or progressive downloading.

The media program system 100 transmits media programs to a first user device 102A such as a computer or a second user device 102B such as a cellphone (hereinafter alternatively referred to as user device(s) 102). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
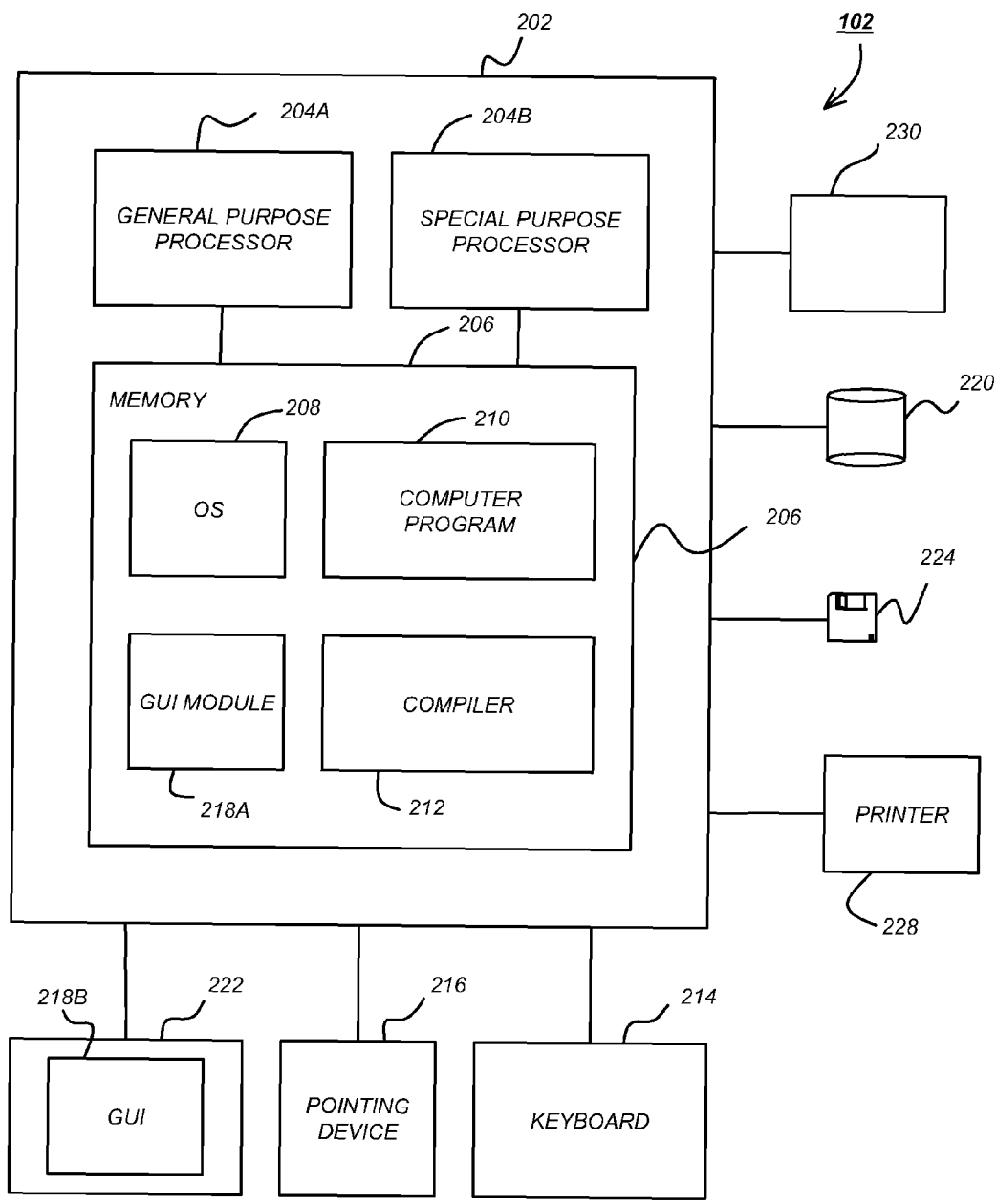
FIG. 2 is a diagram illustrating an exemplary processing system that could be used to implement elements of the present invention.

FIG. 2 illustrates an exemplary processing system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general-purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" or user device is referred to herein, it is understood that a user computer or computer may include portable devices such as cellphones, portable MP3 players, video game consoles, notebook computers, pocket computers, personal data assistants (PDAs) or any other device with suitable processing, communication, and input/output capability.

Figure 3:
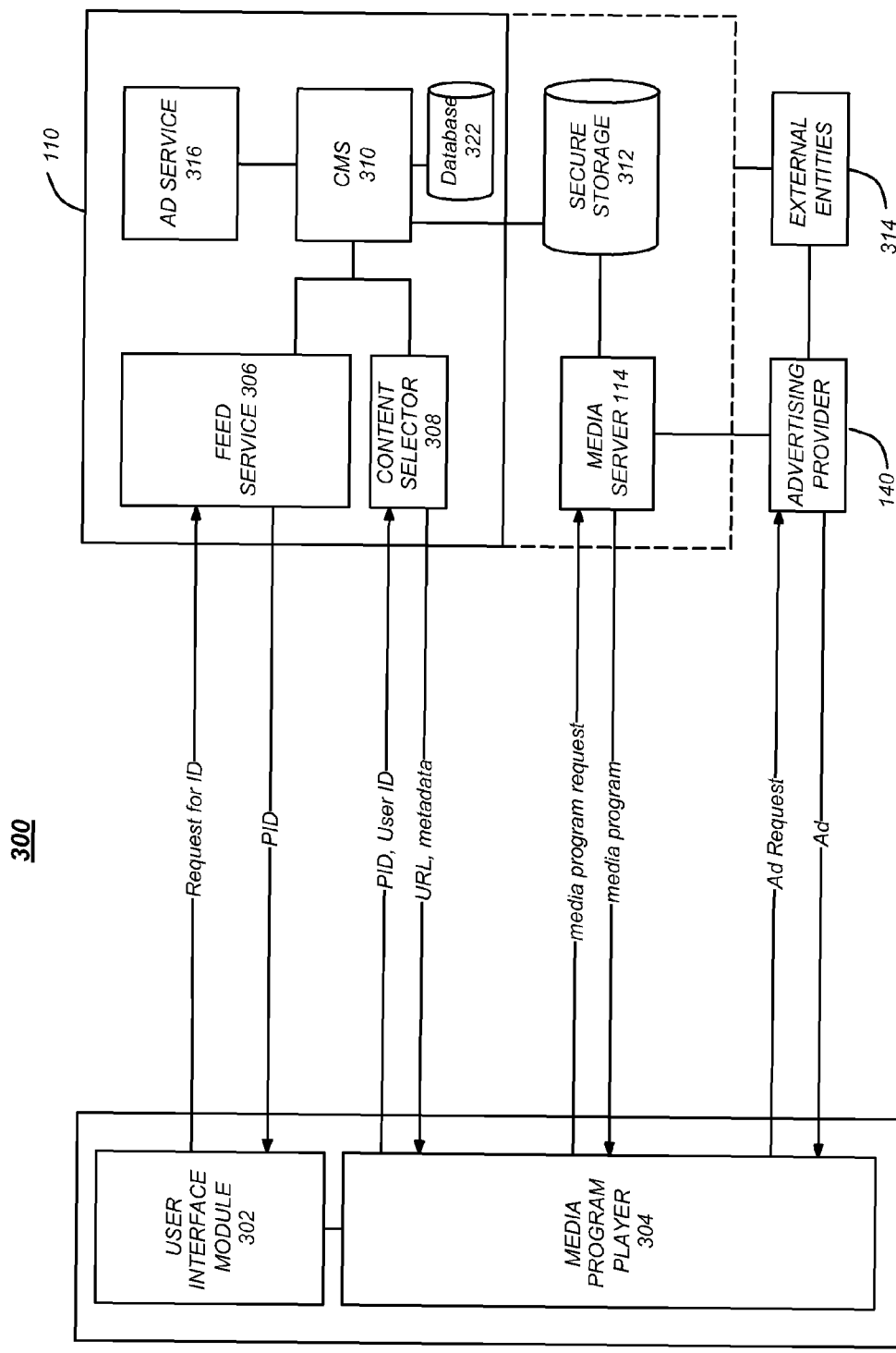
FIG. 3 is a diagram illustrating a first embodiment of a content delivery subsystem.

FIG. 3 is a diagram illustrating a first embodiment of a content delivery subsystem (CDS) 300 and top-level operations that can be used to offer and deliver media programs for selection and presentation to the user 132. In the illustrated embodiment, the content delivery subsystem 300 includes the user device 102, a media program provider 110, and an advertisement provider 140.

In the illustrated embodiment, the media program provider 110 comprises a content management service 310, an advertisement service 316, a feed service 306, and a content selector 308. The CMS 310 stores data in database 322, including metadata regarding available media programs and user data.

When the user 132 selects a media program using the user device 102, a message is transmitted from the user device 102 to the media program provider 110 requesting the media program identifier (PID) of the selected media program.

The feed service 306 receives the request, and using information obtained from secure storage 312 or database 322 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 308, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 may also request advertisements from the advertising provider 120 and receive them as well.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in databases 312 and 322, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Of the data and message transfers depicted in FIG. 3, the request for ID, receipt of the PID from the feed service 306, transmission of the PID and user ID to the content selector 308, the receipt of the URL and metadata from the content selector 308 and the media program and advertising requests typically involve the transfer of relatively small information or messages. However, the transfer of the media program or the advertisement typically involves the transfer of significant information that requires a reasonably high bandwidth link if the information is to be presented to the user in real or near real time. Accordingly, the media program and/or advertisements are compressed via a transcoding process before transmission to the user device 102.

Figure 4:
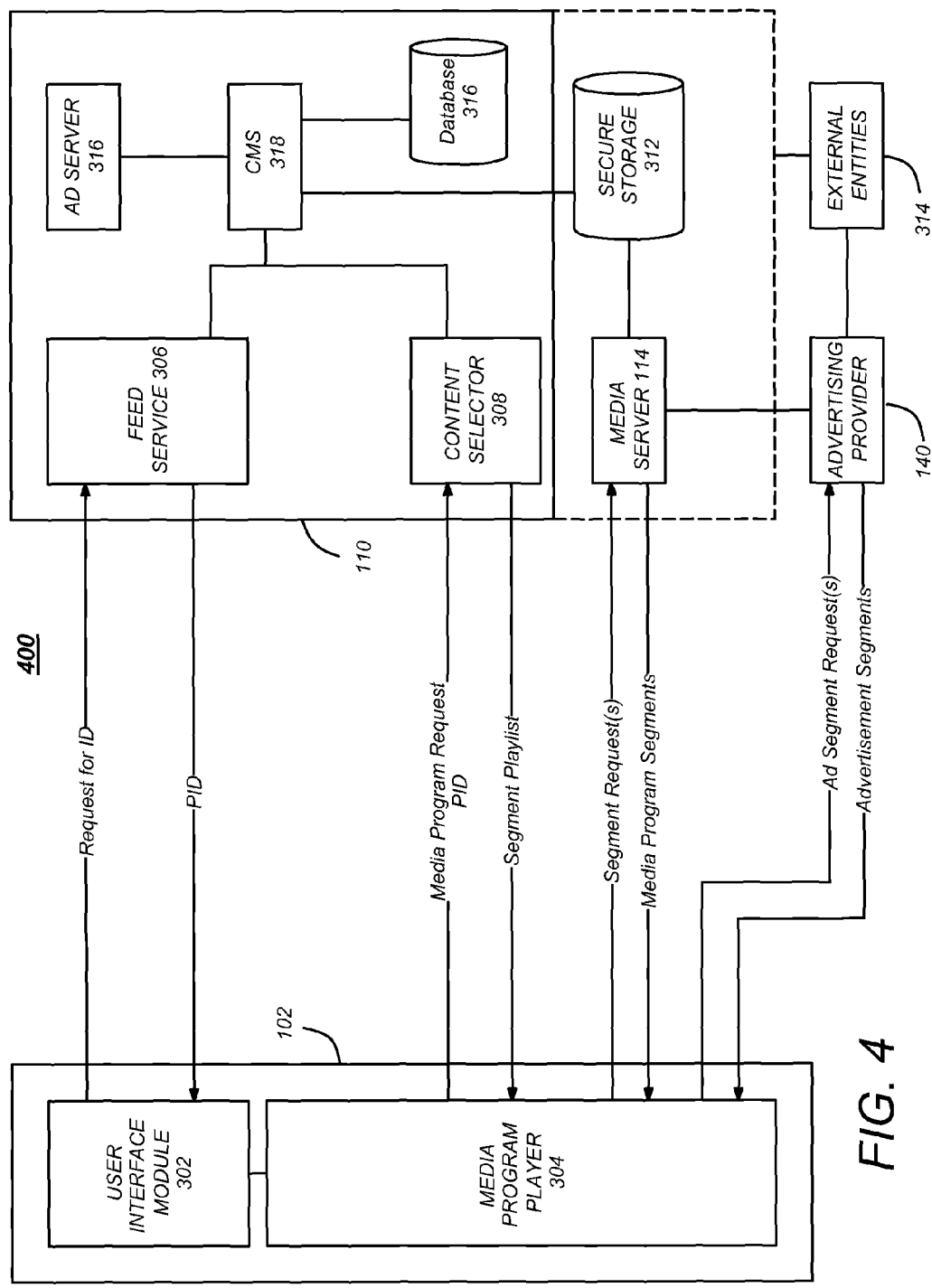
FIG. 4 is a diagram illustrating the transmission of media programs according to a live streaming protocol.

FIG. 4 is a diagram illustrating the transmission of media programs according to a live streaming protocol. Fundamentally, this protocol is similar to the protocol illustrated in FIG. 3, except that when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 4, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

In this embodiment, the media program is broken up into a plurality of segments or chunks that can be transmitted to the user device 102 upon request from the user device 102. Which segments to request and the order to request them is determined by a segment playlist that is transmitted from the media program provider 110 to the user device 102.

The live streaming protocol includes the transmission of a segment playlist having addresses or URIs to the media program segments to the media program player 304. Since the media program player 304 has the information necessary to retrieve any segment (and hence, any frame) using the addresses or URIs in the segment playlist, the user interface module 302 implementing the interface 400, responds to the media program navigation commands by determining segment having the media program frames complying with the navigation request, requesting such segments (if they have not already been received and buffered), and presenting the frames from such segments as indicated above. Similarly to the embodiment shown in FIG. 3, the request for ID, PID, Media program request, segment playlist, media program segment request and advertising segment requests shown FIG. 4 do not require substantial bandwidth. However, the transfer of the media program or advertisement segments typically involves the transfer of significant information that must be significantly compressed before transmission if the information is to be presented to the user in real or near real time. Accordingly, the media program and/or advertisements are compressed via a transcoding process before transmission to the user device 102. Since the transmission protocol shown in FIG. 4 is primarily used for mobile user devices 102 and wireless links, the media program and advertisement segments are typically even more compressed than is the case in the embodiment shown in FIG. 3.

Media programs can be characterized by their resolution, which can be expressed as np, where n represents the vertical resolution (in lines) of the reproduced image and p denotes a progressively scanned (i.e. non-interlaced) image. Since customers' Internet service varies widely in bandwidth, different versions of the media program can be generated, each with a different resolution, typically 480p, 360p, 288p or 240p. Lower resolution versions (e.g. 240p) are transmitted when the bandwidth of the communications link is lower and higher resolution versions (e.g. 480p) are transmitted when communications bandwidth permits. This functionality is typically implemented by the media program player 304 which selects the appropriate version based upon estimated bandwidth.

Although media programs are typically transcoded into multiple versions, each with a different resolution, the same bit rate is typically used to transcode all media programs, regardless of the content. For example, 360p transcoded versions of the media program series "FAMILY GUY" and the media program series "PRISON BREAK" may both be transcoded using the same bit rate. However, since these media programs have different characteristics (one has a great deal more movement and action), the media programs should be encoded with different bit rates to account for these different characteristics, while still achieving the same image quality. For example, an episode of FAMILY GUY will look largely the same whether it is transcoded at 550 Kbps or 350 Kbps, but coding artifacts are likely to be very visible in an action movie clip in PRISON BREAK if it is transcoded at only 350 Kbps.

Figure 5:
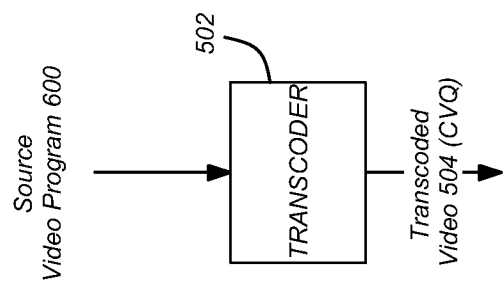
FIG. 5 is a diagram illustrating a typical encoding process.

FIG. 5 is a diagram illustrating a typical encoding process. A source media program 500 such as a video program is provided to a transcoder 502. In a preferred embodiment, the transcoder is a transcoder complying with the H.264 video compression standard, that can be implemented on a general-purpose computer using a computer program, or using a special purpose processor or device. The transcoder 502 encodes the source video program to produce a compressed version of the media program 504. The transcoder 502 accepts parameter inputs that can be used to control the bit rate and quality of the transcoded media program.

Figure 6:
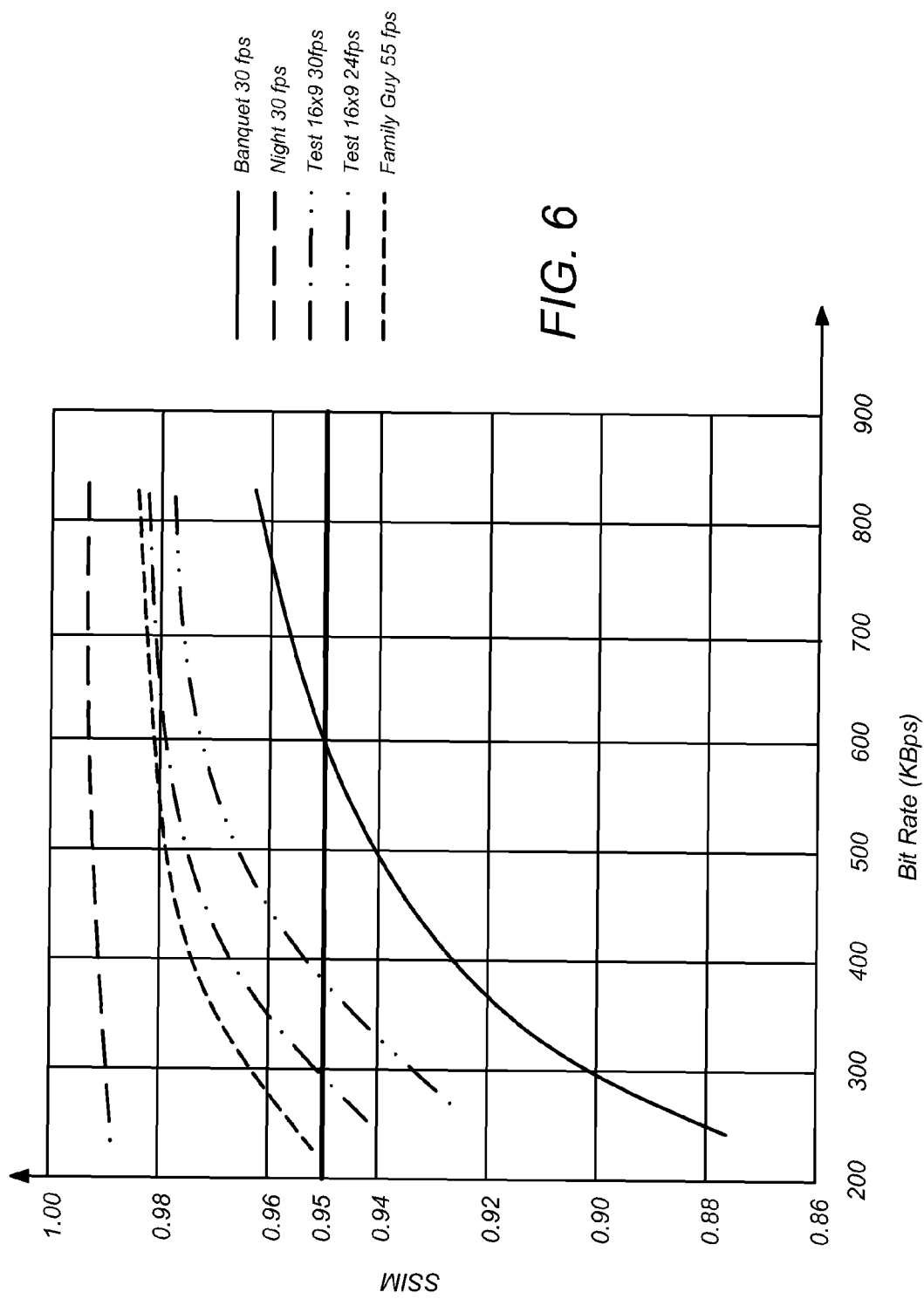
FIG. 6 is a diagram illustrating the relationship between video quality and bit rate for different transcoded media programs.

FIG. 6 is a diagram illustrating the relationship between video quality and bit rate for different transcoded media programs. Video quality is measured by the structural similarity (SSIM) index, which is a measure of the similarity between two images. SSIM is computed on windows of an image (typically applied only over luminescence information), wherein a measure of similarity between two windows x and y of common size N×N is defined as:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

wherein:
$\mu_x$=the average of x;
$\mu_y$=the average of y;
$\sigma_x^2$=the variance of x;
$\rho_y^2$=the variance of y;
$\sigma_{xy}$=the covariance of x and y;
$c_1=(k_1L)^2$, $c_2=(k_2L)^2$ two variables to stabilize the division with weak denominator;
L=dynamic range of the pixel values $$\left(\text{typically } 2^{\frac{\#bits}{pixel}} - 1\right);$$

$k_1$=0.01; and
$k_2$=0.03.

In the diagram shown in FIG. 6, the BANQUET media program has much motion and a complicated image texture, while the NIGHT media program has a dark sequence and few details. FAMILY GUY is a cartoon, and hence, has little or no texture and little motion (backgrounds are typically constant in cartoons).

Note that if a minimum SSIM of 0.95 is desired, that result can be achieved with a bit rate of about 200 Kbps for the NIGHT (at 30 fps) and FAMILY GUY (at 55 fps) media programs. To achieve a minimum SSIM of 0.95 (at 30 fps), the BANQUET media program requires 600 Kbps, significantly greater than required for NIGHT or FAMILY GUY. Note also that for the TEST media program, increasing the frame rate from 24 fps to 30 fps requires an increase in the bit rate from 300 Kbps to almost 400 Kbps to maintain the SSIM at 0.95.

As described above, the performance of the transcoder 502 can be controlled via parameter and control inputs. One such control input directs the transcoder 502 to into a mode where it encodes the media program to a specific targeted video quality, but does not attempt to limit or reduce the file size of the resulting transcoded media program. In this mode, the quality of the resulting video can be controlled via a constant rate factor or CRF.

Figure 7:
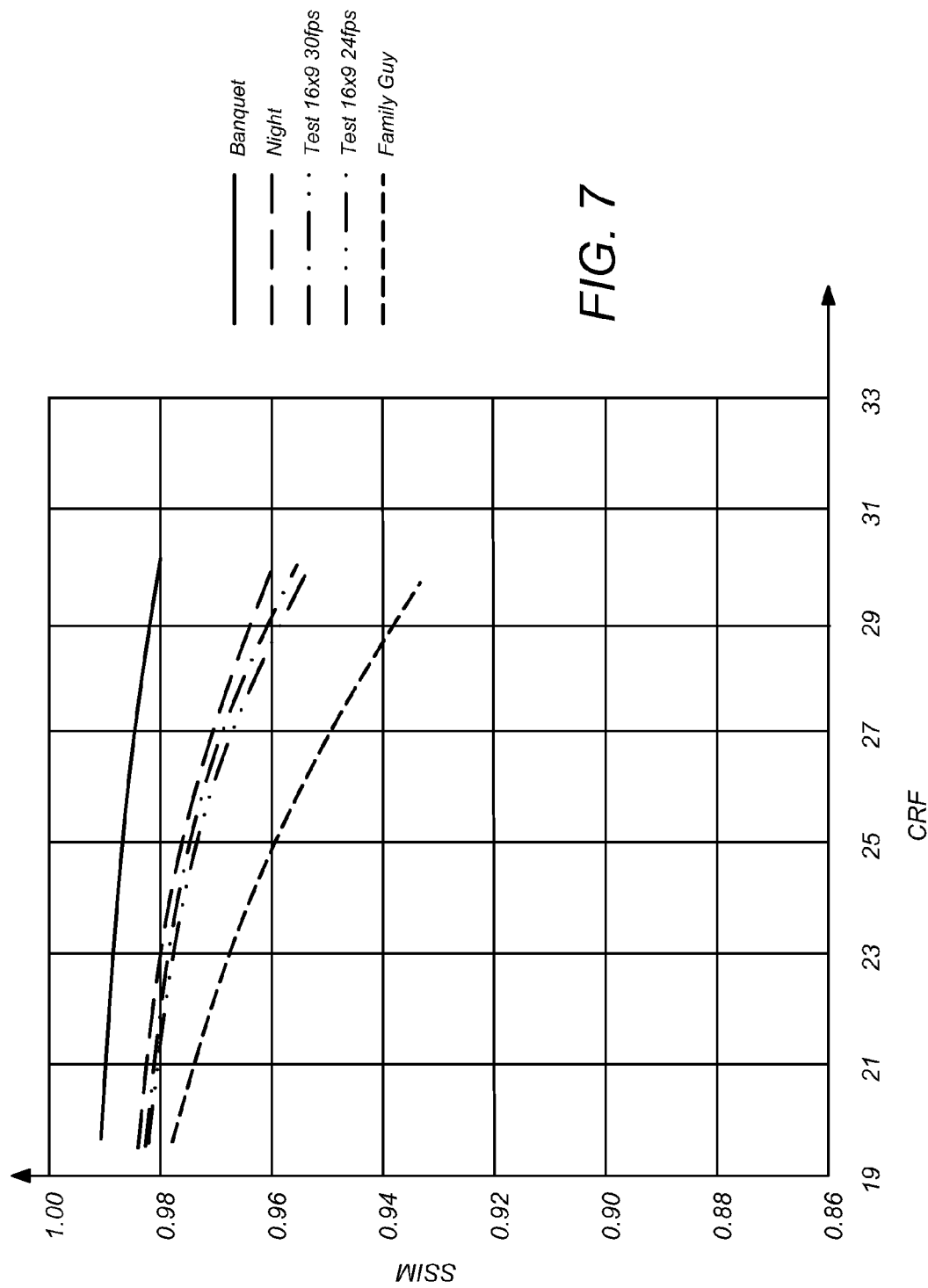
FIG. 7 is a diagram illustrating the SSIM of a number of different media programs after encoding to a targeted video quality.

FIG. 7 is a diagram illustrating the SSIM of a number of different media programs after encoding to a targeted video quality. Note that because the transcoder 502 attempts to encode the media program to a constant quality, encoded media programs encoded according to the same CRF have video quality (SSIM) values vary less than the non-constant quality encoding described in FIG. 5.

For example, FIG. 5 shows that when constant video quality encoding is not selected, the encoding of the BANQUET media program for a bit rate of 400 Kbps results in an SSIM of approximately 0.925, the encoding of FAMILY GUY at the same bit rate results in a significantly better value of about 0.975, a difference of approximately 0.05. Conversely, FIG. 7 shows that when constant video quality encoding is selected, the resulting video quality (SSIM) varies less among the media programs for a given CRF value. For example, note that for a target CRF of 27.0, the SSIM for BANQUET is approximately 0.985, while the SSIM for FAMILY GUY is 0.95, a difference of approximately 0.03.

FIGS. 6 and 7 illustrate that there is the potential for bit savings if media programs are coded with different CRF values. For example, if a minimum SSIM of 0.98 is desired, a media program having little or no texture, limited motion and little image complexity like FAMILY GUY may be encoded according to a CRF of about 19, but a media program having a lot of motion, difficult texture or image complexity such as BANQUET must be encoded according to a CRF of 29 or more. However, this may result in a bit rate of 1 Mbps or more, and media programs having this large of a bit rate are difficult to transmit via the Internet. To more effectively use the available bandwidth of the communications link, an adaptive coding method is described below.

Figure 8:
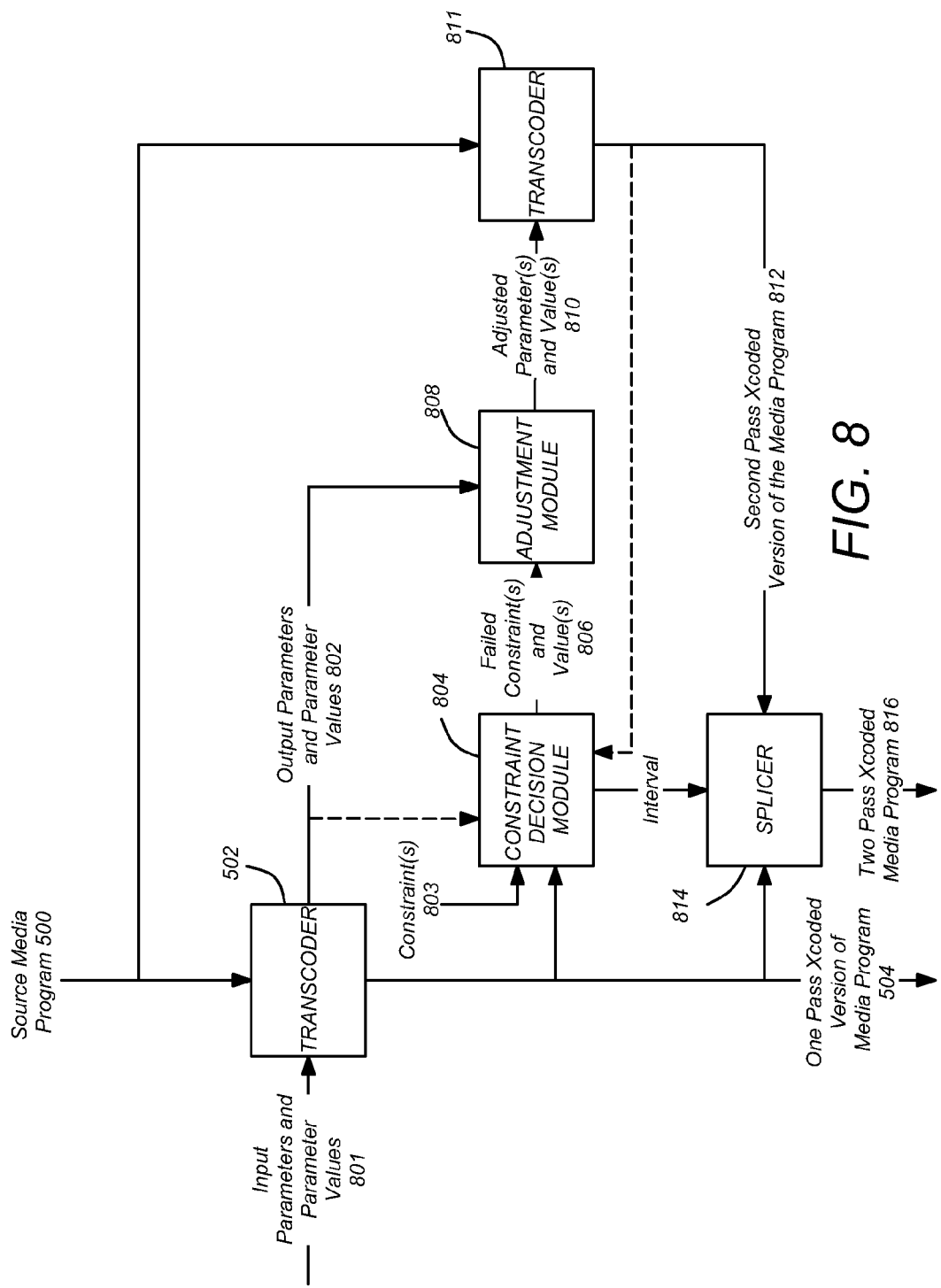
FIG. 8 is a diagram illustrating an adaptive or two pass transcoding process.

FIG. 8 is a diagram illustrating an adaptive or two-pass transcoding process. A source media program 500 such as a video program is provided to the transcoder 502. The transcoder 502 transcodes the source video program 500 according to a set of input parameter(s) and input parameter value(s) 801 to produce a single pass transcoded version of the media program 504.

In one embodiment, the input parameter(s) and values 801 are chosen to select a targeted video quality so that the single pass transcoded version of the media program 504 has a substantially constant video quality, and is transcoded without regard for the size of the transcoded media program 504 or the bit rate needed to transmit it for real time display. A source media program 500 transcoded thusly may be referred to as a substantially constant video quality version of the media program.

The generation of the constant quality version of the media program can be accomplished, for example, by providing the source media program 500 to the transcoder 502 and activating an input parameter control that selects a rate control mode called "constant rate factor" or CRF. Input values for other input parameters 801 (for example, the texture complexity T(n), motion complexity M(n), size (pixels, eg. 640px×360px), and frame rate may also be provided.

Alternatively, the input parameter values 801 may be set so that the first transcoded version of the media program has other desired characteristics. For example, the input parameters may be set so that the first version of the transcoded media program is has a temporally constant bit rate, for example, 400 Mbps.

The transcoder 502 produces (1) a single pass transcoded version of the media program 504, and (2) information about the single pass transcoded version of the media program 504. This information can include output parameters and parameter values 802 (hereinafter alternatively referred to as media program information). The output parameters 802 may be analogous to the input parameters 801 (e.g. texture complexity can be an input parameter as well as an output parameter of the transcoded 502) or the output parameters 802 may be different than the input parameters 801 supplied to the transcoder 502. Hence, the media program information 802 may include encoded media program metrics such as texture complexity T(n), motion complexity M(n), frame rate, size and bit rate (Kbps), and these metrics may be expressed as an average value, maximum value, or as a function of time.

The single pass transcoded version of the media program 504 is provided to a constraint decision module 804, which determines if at least a temporal portion of the first version of the transcoded media program 504 fails to satisfy one or more constraints 803 that are also provided to the constraint decision module 804. This is accomplished by comparing metrics of the single pass transcoded version of the media program 504 with the provided constraints 803. As described below, these metrics may be obtained from the output parameters and parameter values 802 obtained from the transponder 502 or derived separately by the constraint decision module 804.

In an embodiment wherein the single pass transcoded version of the media program 504 is a constant video quality version, a single metric or parameter, namely the bit rate of the constant video quality version of the media program 504 may be used, and the constraint imposed on that metric may be a maximum bit rate. The bit rate measurement and constraint may be specified in terms of a maximum or peak bit rate of the constant quality version of the transcoded media program that is measured over the entire media program or only a temporal portion or interval of the transcoded media program.

For example, the constraint 803 may demand that the instantaneous bit rate not exceed X Mbps for any more than Y seconds or frames. In this case, the constraint decision module 804 measures the instantaneous bit rate of the constant quality transcoded media program and compares the measured instantaneous bit rate to the constraint 803.

In one embodiment, the constraint decision module 804 uses the output parameter values 802 provided by the transcoder 502 (as indicated by the dashed line in FIG. 8) to determine if the constraint is satisfied. For example, transcoder 502 may provide the size of the first version of the transcoded media program, and the constraint decision module may compare that provided size to a maximum value to determine if the first version of the first version of the transcoded media program 504 meets requirements for transmission.

In another embodiment, the constraint decision module 804 includes an analysis submodule that analyzes the single pass transcoded version of the media program to obtain the measured metric(s) that are compared to the constraint(s) by the constraint decision module 804. For example, the constraint decider module 804 may measure the instantaneous bit rate of the single pass transcoded version of the media program and may compare that measured instantaneous bit rate to a constraint describing a maximum bit rate over a temporal portion of the media program ("X Mbps for more than Y seconds"). Supposing for example that constraint 803 is that the instantaneous bit rate not exceed 40 Mbps for more than 10 seconds, the constraint decision module 803 compares that constraint with the measured instantaneous bit rate of the first version of the transcoded media program 504 to determine if the constraint is satisfied.

Other measured metrics and associated constraints 803 may be used. Such metrics can include the peak and/or average bit rate for the entire first version of the transcoded media program 504; the variance of the instantaneous bit rate of the first version of the transcoded media program 504; the size of the first version of the transcoded media program 504, or metrics reflecting any of the input parameters 801 to the transcoder 502 (e.g. the average or instantaneous texture complexity ($T(u,t)$) or motion complexity ($M(u,t)$)).

If the entire single pass transcoded version of the media program 504 satisfies all specified constraints 803, the single pass transcoded version of the media program 504 may be provided as the transcoded media program 504, as shown in FIG. 8.

If, however, the entire single pass transcoded version of the media program 504 does not satisfy all of the specified constraints, the failed constraint and values 806 as well as a time interval describing the temporal portion of the single pass transcoded version of the media program that failed the constraint is passed along for further processing.

However, if at least a portion of the single pass transcoded version of the media program 504 does not satisfy all of the input constraints 803, a second pass of transcoding using an adjusted input parameter value 810 will be performed for those portions of the single pass transcoded version of the media program 504 that did not satisfy the constraint.

As shown in FIG. 8, this can be performed by providing the failed constraint(s) and value(s) 806 to an adjustment module 808. The output parameters and parameter values 802 as well as the input parameters and parameter values 801 may also be provided to the adjustment module 808. The adjustment module 808 uses this information to arrive at the adjusted parameters 810 that transcoder 811 uses to generate a second pass transcoded version to replace the portions of the single pass transcoded version of the media program that failed the constraint.

To perform this task, a transcoder 811 accepts the adjusted parameters 810, the source media program 500, the time interval over which a second pass transcoded version of the media program 812 is desired, and transcodes the selected interval or portion of the source media program to generate the second pass transcoded version of the media program 812.

In the above-described embodiment, the input parameters 801 directed the transcoder 502 to generate a constant video quality transcoded version of the media program and the constraint decision module 804 analyzed the constant video quality version of the media program to measure the instantaneous bit rate and compared that measured value to a constraint that the instantaneous bit rate should not exceed X Mbps for Y or more seconds. Returning now to that exemplary embodiment, the failed constraint and value 806 provided from the constraint decision module 804 to the adjustment module 808 may include, for example:

TABLE I

| Instantaneous Bit Rate | Interval |
|---|---|
| 40 Mbps | 1:30:22-1:31:41 |
| 45 Mbps | 1:30:25-1:31:12 |
| 50 Mbps | 1:30:31-1:30:42 |

The adjustment module 808 accepts this information and generate adjusted input parameter values 810 to command the transcoder 811 to generate a second pass transcoded version of the media program 812 for the time interval over which the constraint was violated so that when the second pass version of the media program is spliced with the first pass version of the media program, the resulting combination satisfies all of the constraints 803. In this case, since the failed constraint 803 is the maximum instantaneous bit rate over a time interval of the transcoded media program, the adjustment module 808 commands the transcoder 811 to generate a constant bit rate version of the source media program 812 having a bit rate that meets the constraint 803 for the time interval over which the maximum bit rate was exceeded. To perform this task, the transcoder 811 is provided the adjusted input parameters and value(s) 810 and the source media program 500. In the example wherein the constraint is a maximum instantaneous bit rate of 40 Mbps, the adjusted parameters and values 810 will command the transcoder 811 to generate a constant bit rate transcoded version of the media program 812 having a maximum instantaneous bit rate of no more than 40 Mbps.

Although this process may be performed using a second transcoder 811, the foregoing operation may be performed using the same transcoder 512 that was used to generate the single pass transcoded version of the media program 504.

The second pass transcoded version of the media program 812 is then supplied to a splicer 814, which substitutes the second pass transcoded version of the media program 812 for the portion or interval of the single pass transcoded version of the media program 504 over which the constraint was not satisfied via a splicing operation. For example, in the above case wherein the maximum bit rate was exceeded during the time interval of 1:30:22-1:31:41, the transcoder 811 generates a constant bit rate transcoded version of the media program 812 for the 1:30:22-1:31:41 time interval, and substitutes this for the portion of the single pass transcoded version of the media program 504 that did not satisfy the constraint. The result is a two-pass transcoded version of the media program 816 which provides the desired high video quality and does not exceed the maximum bit rate constraint.

In one embodiment, the first pass transcoded version of the media program 504 comprises a plurality of frames including I-frames, P-frames, and B-frames. I frames are intra-coded frames that are compressed versions of a single frames. Unlike the P-frames and B-Frames, I-frames do not depend on data in preceding or following frames. P-frames provide more compression than I-frames because they use information in a previous I-frame or P-frame (reference frame), and hence, to generate a P-frame, that previous I-frame or P-frame must first be reconstructed. B-frames are similar to P-frames except that B-frames use the picture in a subsequent reference frame as well as the picture in a preceding reference frame. As a result, B-frames usually provide more compression than P-frames. B-frames are never reference frames. Typically, every 15th frame or so is made into an I-frame. P-frames and B-frames might follow an I-frame like this, IBBPBBPBBPBB(I), to form a Group Of Pictures (GOP).

Figure 9:
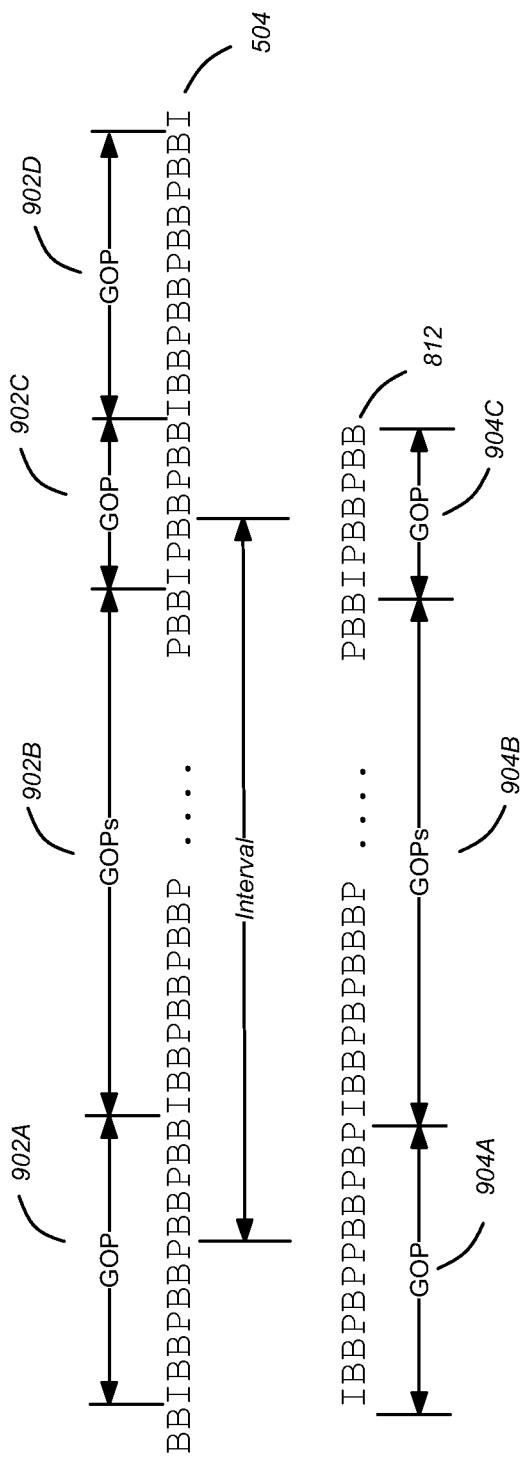
FIG. 9 is a diagram illustrating one embodiment of a series of I, P, and B-frames that could comprise the first pass transcoded media program.

FIG. 9 is a diagram illustrating one embodiment of a series of I, P, and B-frames that could comprise the first pass transcoded media program 504. In one embodiment, to allow the second pass transcoded version of the media program 812 to be more easily substituted for the portion of the single pass transcoded version of the media program, the second pass of the transcoded version of the media program comprises the smallest integer number of a group of pictures that span the interval for which the constraint is not satisfied. For example, in the example shown in FIG. 9, the interval of the first pass transcoded version of the media program 504 for which the constraint is not satisfied is shown. The frames of the first pass transcoded version of the media program 504 includes GOPs 902A-902D. Since the interval over which the constraint 803 is was not satisfied begins and/or ends within a group of pictures 902, the second pass transcoded version of the media program 812 is generated to include the smallest integer number of groups of pictures that still span the entire interval.

Since lower video quality is often unnoticeable in scenes having a lot of action or complex backgrounds, the resulting two-pass version of the transcoded media program may be indistinguishable from that of the single pass version, yet be more suitable for transmission via links with limited bandwidth. If, however, the video quality is insufficient, the process may be repeated with additional passes and different adjusted parameter(s) and value(s) 810, as shown by the dashed line from transcoder 811 to the constraint decision module 804. For example, the textural complexity (T(n)) and/or motion complexity (M(n)) provided to the transcoder 811 may be altered to improve the video quality or to reduce the maximum instantaneous bit rate. Or, the adjusted parameter(s) and value(s) may be altered to command the transcoder 811 in further passes to generate a constant bit rate version of the media program having a greater or lesser bit rate than was commanded for the second pass.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of encoding a source media program, the method comprising:
    (a) before a request for transmission of the media program, performing a first pass transcoding for all frames of the source media program to produce a constant video quality transcoded version of the source media program, wherein the constant video quality transcoded version is transcoded by a transcoder operating in a first mode that targets a video quality;
    (b) after performing the first pass transcoding of all the frames of the source media program, analyzing all of the frames of the constant video quality transcoded version using an interval of a plurality of frames;
    (c) determining when a plurality of frames of the constant video quality transcoded version of the transcoded media program fail to satisfy a constraint related to a bit rate based on the analyzing of all the frames using the interval;
    (d) when the plurality of frames of the constant video quality transcoded version fail to satisfy the constraint, adjusting at least one transcoding parameter of a set of transcoding parameters such that the constraint can be satisfied by a constant bit rate transcoding of the plurality of frames of the source media program;
    (e) after the first pass transcoding of all the frames of the source media program, performing a second pass transcoding of the plurality of frames of the source media program according to the adjusted at least one transcoding parameter to produce a constant bit rate version of the plurality of frames of the source media program, wherein the constant bit rate version of the plurality of frames of the source media program is transcoded by the transcoder operating in a second mode that targets the bit rate;
    (f) in response to producing the plurality of frames of the constant bitrate version, substituting the constant bit rate version of the plurality of frames for the plurality of frames in the constant video quality transcoded version to generate a transcoded source media program;
    (g) before the request for transmission, storing the transcoded source media program in storage as a version of the source media program to be transmitted; and
    (h) providing the version of the transcoded source media program from the storage for transmission in response to the request for the version.

2. The method of claim 1, wherein:
    the set of parameters includes texture complexity, video complexity, motion complexity, and picture rate; and
    the method further comprises analyzing the constant video quality transcoded version of the transcoded media program to provide transcoded video information selected from the group comprising instantaneous bit rate, peak bit rate for an entire constant video quality transcoded version of the transcoded media program, average bit rate for an entire constant video quality transcoded version of the transcoded media program, a variance of an instantaneous bit rate of the constant video quality transcoded version of the transcoded media program; a size of the constant video quality transcoded version of the transcoded media program, and metrics reflecting any of the set of parameters.

3. The method of claim 1, further comprising:
(i) determining when the plurality of frames of the constant bit rate version fail to satisfy the constraint; and
(j) when the plurality of frames of the constant bit rate version fail to satisfy the constraint, further adjusting the at least one parameter of the set of parameters and repeating step i) until the plurality of frames of the constant bit rate version satisfy the constraint, then performing step (f).

4. The method of claim 1, further comprising:
(i) determining when the plurality of frames of the constant bit rate version fail to satisfy the constraint; and
(j) when the plurality of frames of the constant bit rate version fail to satisfy the constraint, adjusting another parameter of the set of parameters and repeating step (i) until the plurality of frames of the constant bit rate version satisfy the constraint, then performing step (f).

5. The method of claim 4, wherein adjusting another parameter of the set of parameters comprises adjusting a transcoded video texture complexity parameter to reduce transcoded video texture complexity.

6. The method of claim 1, wherein the constraint is a maximum instantaneous bit rate during the interval.

7. The method of claim 1, wherein the plurality of frames comprises a smallest integer number of a group of pictures that span the plurality of frames.

8. The method of claim 1, wherein the transcoder comprises a first transcoder operating in the first mode and a second transcoder operating in the second mode.

9. The method of claim 1, wherein the version of the source media program is associated with the targeted bitrate used to transcode the constant bit rate version of the portion of the transcoded media program.

10. The method of claim 1, wherein the version of the source media program is stored with other versions of the source media program, wherein each version of the source media program is associated with a different resolution.

11. An apparatus for encoding a source media program, the apparatus comprising:
means for performing a first pass transcoding for all frames of the source media program to produce a constant video quality transcoded version of the source media program, wherein the constant video quality transcoded version is transcoded by a transcoder operating in a first mode that targets a video quality;
means for analyzing all of the frames of the constant video quality transcoded version using an interval of a plurality of frames after performing the first pass transcoding of all the frames of the source media program;
means for determining when a plurality of frames of the constant video quality transcoded version of the transcoded media program fail to satisfy a constraint related to a bit rate based on the analyzing of all the frames using the interval;
means for adjusting at least one transcoding parameter of a set of transcoding parameters such that the constraint can be satisfied by a constant bit rate transcoding of the plurality of frames of the source media program when the plurality of frames of the constant video quality transcoded version fail to satisfy the constraint;
means for performing a second pass transcoding of the plurality of frames of the source media program according to the adjusted at least one transcoding parameter to produce a constant bit rate version of the plurality of frames of the source media program, wherein the constant bit rate version of the plurality of frames of the source media program is transcoded by the transcoder operating in a second mode that targets the bit rate after the first pass transcoding of all the frames of the source media program;
means for substituting the constant bit rate version of the plurality of frames for the plurality of frames in the constant video quality transcoded version to generate a transcoded source media program in response to producing the plurality of frames of the constant bitrate version;
means for storing, before the request for transmission, the transcoded source media program in storage as a version of the source media program to be transmitted; and
means for providing the version of the transcoded source media program from the storage for transmission in response to the request for the version.

12. The apparatus of claim 11, wherein:
the set of parameters includes texture complexity, video complexity, motion complexity, and picture rate; and
the apparatus further comprises means for analyzing the constant video quality transcoded version of the transcoded media program to provide transcoded video information selected from the group comprising instantaneous bit rate, peak bit rate for an entire constant video quality transcoded version of the transcoded media program, average bit rate for an entire constant video quality transcoded version of the transcoded media program, a variance of an instantaneous bit rate of the constant video quality transcoded version of the transcoded media program; a size of the constant video quality transcoded version of the transcoded media program, and metrics reflecting any of the set of parameters.

13. The apparatus of claim 11, further comprising:
means for determining when the plurality of frames of the constant bit rate version fail to satisfy the constraint; and
means for further adjusting the at least one parameter of the set of parameters and repeatedly transcoding the plurality of frames of source media program according to the further adjusted at least one transcoding parameter until the plurality of frames of the constant bit rate version satisfy the constraint.

14. The apparatus of claim 11, further comprising:
means for determining when the plurality of frames of the constant bit rate version fail to satisfy the constraint; and
means for adjusting another parameter of the set of parameters and for repeatedly transcoding the plurality of frames of the source media program according to the further adjusted at least one transcoding parameter until the plurality of frames of the constant bit rate version satisfy the constraint.

15. The apparatus of claim 14, wherein the means for adjusting another parameter of the set of parameters comprises means for adjusting a transcoded video texture complexity parameter to reduce transcoded video texture complexity.

16. The apparatus of claim 11, wherein the constraint is a maximum instantaneous bit rate during the interval.

17. The apparatus of claim 11, wherein the plurality of frames comprises a smallest integer number of a group of pictures that span the plurality of frames.

18. An apparatus for encoding a source media program, comprising:
a first transcoder for performing a first pass transcoding for all frames of the source media program to produce a constant video quality transcoded version of the source media program before a request for transmission, wherein the constant video quality transcoded version is transcoded by the first transcoder operating in a first mode that targets a video quality;
a constraint decision module for analyzing all of the frames of the constant video quality transcoded version using an interval of a plurality of frames after performing the first pass transcoding of all the frames of the source media program and determining when a plurality of frames of the constant video quality transcoded version of the transcoded media program fail to satisfy a constraint related to a bit rate based on the analyzing of all the frames using the interval;
an adjustment module for adjusting at least one transcoding parameter of a set of transcoding parameters such that the constraint can be satisfied by a constant bit rate transcoding of the plurality of frames of the source media program when the plurality of frames of the constant video quality transcoded version fail to satisfy the constraint;
a second transcoder for performing a second pass transcoding of the plurality of frames of the source media program according to the adjusted at least one transcoding parameter to produce a constant bit rate version of the plurality of frames of the source media program after the first pass transcoding of all the frames of the source media program, wherein the constant bit rate version of the plurality of frames of the source media program is transcoded by the transcoder operating in a second mode that targets the bit rate;
a splicer for substituting the constant bit rate version of the plurality of frames for the plurality of frames in the constant video quality transcoded version to generate a transcoded source media program in response to producing the plurality of frames of the constant bitrate version;
storage for storing, before the request for transmission, the transcoded source media program in storage as a version of the source media program to be transmitted, wherein the version of the source media program is provided from the storage for transmission in response to the request for the version.

19. The apparatus of claim 18, wherein:
the set of parameters includes texture complexity, video complexity, motion complexity, and picture rate; and the constraint decision module further comprises an analysis module for analyzing the constant video quality transcoded version of the transcoded media program to provide transcoded video information selected from the group comprising instantaneous bit rate, peak bit rate for an entire constant video quality transcoded version of the transcoded media program, average bit rate for an entire constant video quality transcoded version of the transcoded media program, a variance of an instantaneous bit rate of the constant video quality transcoded version of the transcoded media program; a size of the constant video quality transcoded version of the transcoded media program, and metrics reflecting any of the set of parameters.

20. The apparatus of claim 8, wherein:
the constraint decision module further determines when the plurality of frames of the constant bit rate version fail to satisfy the constraint, the adjustment module further adjusts the at least one parameter of the set of parameters, and the second transcoder repeatedly transcodes the plurality of frames of source media program according to the further adjusted at least one transcoding parameter until the plurality of frames of the constant bit rate version satisfy the constraint.

21. The apparatus of claim 18, wherein:
the constraint decision module further determines when the plurality of frames of the constant bit rate version fail to satisfy the constraint, the adjustment module adjusts another parameter of the set of parameters, and the second transcoder repeatedly transcodes the plurality of frames the source media program according to the further adjusted at least one transcoding parameter until the plurality of frames of the constant bit rate version satisfy the constraint.

22. The apparatus of claim 21, wherein the adjustment module adjusts a transcoded video texture complexity parameter to reduce transcoded video texture complexity.

23. The apparatus of claim 18, wherein the constraint is a maximum instantaneous bit rate during the interval.

24. The apparatus of claim 18, wherein the plurality of frames comprises a smallest integer number of a group of pictures that span the plurality of frames.

* * * * *

UNITED STATES PATENT AND TRADEMARK OFFICE
CERTIFICATE OF CORRECTION

PATENT NO. : 9,832,540 B2  
APPLICATION NO. : 12/969016  
DATED : November 28, 2017  
INVENTOR(S) : Yupeng Liao, Kang Kang and Zhibing Wang Page 1 of 1

It is certified that error appears in the above-identified patent and that said Letters Patent is hereby corrected as shown below:

In the Claims

In Column 18, Claim 21, Line 32, please delete "ity of frames the source media program according to" and insert --ity of frames of the source media program according to--.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*